(12) United States Patent
Bocchetti

(10) Patent No.: US 10,046,227 B2
(45) Date of Patent: Aug. 14, 2018

(54) DEVICE FOR TRAINING THE SWING ADDRESSED TO GOLF PLAYERS

(71) Applicant: Antonio Bocchetti, Rome (IT)

(72) Inventor: Antonio Bocchetti, Rome (IT)

( * ) Notice: Subject to any disclaimer, the term of this patent is extended or adjusted under 35 U.S.C. 154(b) by 14 days.

(21) Appl. No.: 15/027,412

(22) PCT Filed: Nov. 7, 2014

(86) PCT No.: PCT/EP2014/074032
§ 371 (c)(1),
(2) Date: Apr. 5, 2016

(87) PCT Pub. No.: WO2015/071187
PCT Pub. Date: May 21, 2015

(65) Prior Publication Data
US 2016/0250543 A1    Sep. 1, 2016

(30) Foreign Application Priority Data
Nov. 12, 2013   (IT) .............................. RM2013A0623

(51) Int. Cl.
*A63B 69/00*    (2006.01)
*A63B 71/06*    (2006.01)
(Continued)

(52) U.S. Cl.
CPC ...... *A63B 71/0622* (2013.01); *A63B 69/0057* (2013.01); *A63B 69/0079* (2013.01); *A63B 69/36* (2013.01); *A63B 69/3608* (2013.01); *A63B 69/3661* (2013.01); *A63B 69/3667* (2013.01); *G09B 19/0038* (2013.01); *A63B 2069/367* (2013.01); *A63B 2071/0625* (2013.01); *A63B 2207/02* (2013.01); *A63B 2220/10* (2013.01); *A63B 2220/16* (2013.01); *A63B 2220/801* (2013.01);
(Continued)

(58) Field of Classification Search
CPC .. A63B 69/36; A63B 69/3608; A63B 69/3667
See application file for complete search history.

(56) References Cited

U.S. PATENT DOCUMENTS 5,039,105 A * 8/1991 Ro ..................... A63B 69/3641
434/252
5,087,047 A * 2/1992 McConnell ............ A63B 69/36
250/215
(Continued)

*Primary Examiner* — James S McClellan
*Assistant Examiner* — Kevin Carter

(57) ABSTRACT

A device for training a golf swing addressed to a golfer having a supporting element on which a vertical rigid rod is placed. The rod is connected to a horizontal rigid rod which is connected to a terminal supporting element on which the golfer keeps his forehead continuously in touch. The device has a protruding element connected to the vertical rod on which a chainlet is connected at the end, and a golf ball is hanged and kept jointed to the chainlet. A laser emitting and receiving device is able to emit and receive a laser beam to detect the rotation angle of the player's bust in respect to the front direction. A system of video cameras and image processing software detect the orientation of the golf club at the moment of impact on the ball, and the golfer is then informed by the device if the swing was correct.

10 Claims, 3 Drawing Sheets

(51) Int. Cl.
*A63B 69/36* (2006.01)
*G09B 19/00* (2006.01)

(52) U.S. Cl.
CPC ... *A63B 2220/805* (2013.01); *A63B 2220/806* (2013.01); *A63B 2225/09* (2013.01); *A63B 2225/093* (2013.01); *A63B 2225/20* (2013.01)

(56) References Cited

U.S. PATENT DOCUMENTS

| | | | |
|---|---|---|---|
| 6,402,633 B1* | 6/2002 | Hsiung | A63B 69/3608 473/219 |
| 2007/0026369 A1* | 2/2007 | Smith | A63B 24/0003 434/252 |
| 2007/0238538 A1* | 10/2007 | Priester | A63B 24/0003 473/131 |
| 2011/0159980 A1* | 6/2011 | Pelz | A63B 69/3614 473/220 |
| 2011/0207545 A1* | 8/2011 | Huff | A63B 69/0057 473/266 |

* cited by examiner

DEVICE FOR TRAINING THE SWING ADDRESSED TO GOLF PLAYERS

CROSS REFERENCE TO RELATED APPLICATIONS

This is a National Stage of International Application No. PCT/EP2014/074032, filed Nov. 7, 2014, which claims the priority of Italian Application No. RM2013A000623, filed Nov. 12, 2013, the entire disclosures of which are hereby incorporated by reference in their entirety.

BACKGROUND OF THE INVENTION

1. Field of the Invention

The present invention regards a device that can be properly used for training of golf players, and more in particular in order to train the swing, that is a specific movement that is achieved when the ball is hit and launched towards a target, making the same ball to lift up from ground.

2. Description of the Prior Art

As known, in order to practice the swing, the player puts his body in front of the ball, he takes the club using both his hands, and brings the club behind his head, making his shoulders and back to rotate. From a position having the club on the top, he starts the way down to the ball, by a rotary motion towards the objective of reaching and hit the ball. At the time of contact with the ball, the motion of the hip and the rest of the body continues. When the club and the arms point to the target, the head starts to turn. At the time that the ball has been hit and launched in the air, the last step of the swing starts: the hip completes the rotation, the arms move in angle and the body results to be directed to the target, with the club touching the back behind the neck.

In order to have the player to achieve an effective swing, it is strictly necessary the he follows the correct movements at each single step, in particular it is important that, at the starting steps, the position of the head in the player is kept fixed, so that the bust can rotate around it properly. Instead, one of the most common mistakes is to avoid to rotate the bust completely, or to move up the head before the ball has been hit.

In any case, in order to achieve the skills of a good golf player, like in any other sport, it is necessary to follow a significant training, up to the time when the movements of the body are achieved correctly and precisely, and when the swing is achieved quickly, intuitively and effectively.

The possibility to train continuously and frequently in a real field of golf usually meets the typical difficulties of an outdoor sport, because it is affected by the weather and season conditions of rain, wind, temperature and humidity. Furthermore, the expensive cost of using a real field of golf and the need to move following long distances, from one position to another, makes the training an activity that is very long and very hard, therefore it is known the use of practice fields, where players train only on the continuous execution of the swing.

Recently, with the arrival of new technologies, some simulation systems of a golf game have been proposed that use the computer graphics on maxi-screens in order to reconstruct some virtual fields of golf, and that permit to players the continuous training of the swing in an indoor environment.

However, all the systems known from the prior art do not allow a support to the player in order to keep a correct posture and a proper sequence of movements. They permit to the player to evaluate the result of the swing on the basis of the drive, direction and speed given to the ball.

The fact to understand, from the resulting trajectory of the ball, a possible error in the posture and/or motion of the body, is very difficult for a new player, and usually the judgement of an expert teacher is required in order to recognize the proper aspects to be improved in the execution of the swing.

SUMMARY OF THE INVENTION

Therefore, the main objective of the present invention is to overcome all the above drawbacks, proposing a device for training the swing, addressed to golf players, giving the support of a fixed point to the head, so that the player can become comfortable with the movements, rotating the bust and keeping the head fixed until the time of the contact with the ball has reached.

Another objective of the invention is to provide an automatic computer system able to detect the angle of rotation of the player's bust in respect to the front direction, and able to provide a start signal for the execution of the swing, by an acoustic or visual signal, or by a graphic message on a video screen.

Another further objective of the invention is to provide an automatic computer system able to detect the dynamics of the club's motion and, at the moment of touch with the ball, to detect the exact position of the club's end, the player's head and feet, so that it can be recognized if the swing has been executed correctly or not.

Another further objective is that the device of the invention should be adaptable in height, distance and angle, so that it can be suitable to the body and to a comfortable use of different players.

Another further objective of the invention is to provide an automatic computer system able to detect in real time the complete dynamics of the player's motion of body, to compare said dynamics with the content of a database, and to recognize if the swing has been executed correctly or not.

Another further objective is that the device of the invention could be integrated in more complex systems for simulation of the golf game that use the computer graphics projected on maxi-screens, in order to reconstruct some virtual fields of golf, and that the device uses the data detected in the swing in order to define the drive, direction, speed and effect given to the ball.

Therefore, it is specific subject of the present invention a device for training the swing, addressed to golf players, characterized in that comprising:

- a supporting element on which a vertical rigid rod is placed, that is connected, at the upper end, to a horizontal rigid rod; said horizontal rod being further connected to a terminal supporting element on which a golf player can keep his forehead continuously in touch;
- a protruding element, connected to said vertical rod, on which a chainlet is connected at the end, so that a golf ball is hanged and kept jointed to said chainlet;
- a laser emitting and receiving device, able to emit and receive a laser beam reflected by a small plate placed on the upper part of player's arm, and therefore able to detect the rotation angle of the player's bust in respect to the front direction;
- a system of video cameras and image processing software able to detect in real time the space coordinates and the orientation of a golf club;

a data processing and presentation unit, that receives as input the data from said laser device, related to the player's arm angle, the data from said system of video cameras related to the dynamics of the motion of the club and the position of the head of the club at the moment of the impact on the ball; so that a start signal can be generated at the time that the laser device detects a specific rotation angle of the arm, and therefore a related rotation angle of the player's bust, and so that at the end of the swing a signal of right swing or wrong swing can be generated, according to position and impact angle between the head of the club and the ball.

The present invention is now being described according to non-limiting examples, with particular reference to the figures of the enclosed drawings. In the drawings, like reference characters refer to like parts throughout the views in which:

DETAILED DESCRIPTION OF A PREFERRED EMBODIMENT

Figure 1:
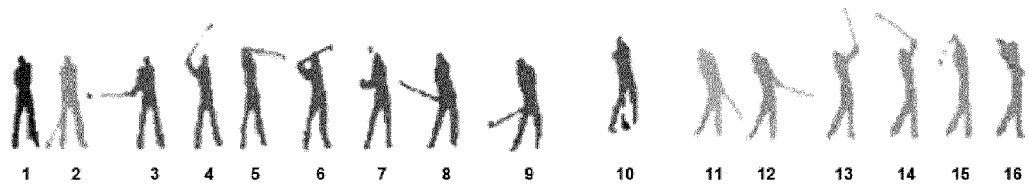
FIG. 1 is a schematic view of a sequence of frames in an animation regarding a golf player, which represents a sequence of positions belonging to a swing.
Figure 2:
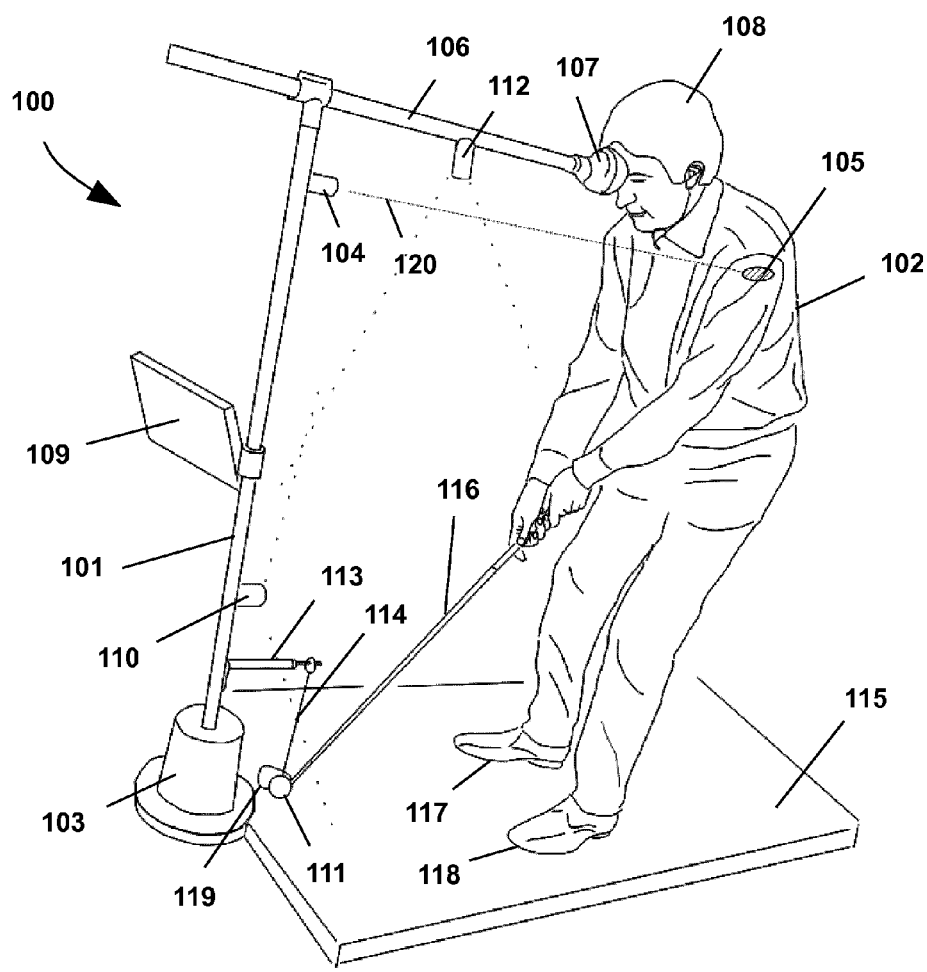
FIG. 2 is a perspective view of a device for training the swing, according to the present invention, including a golf player using the same device.
Figure 3:
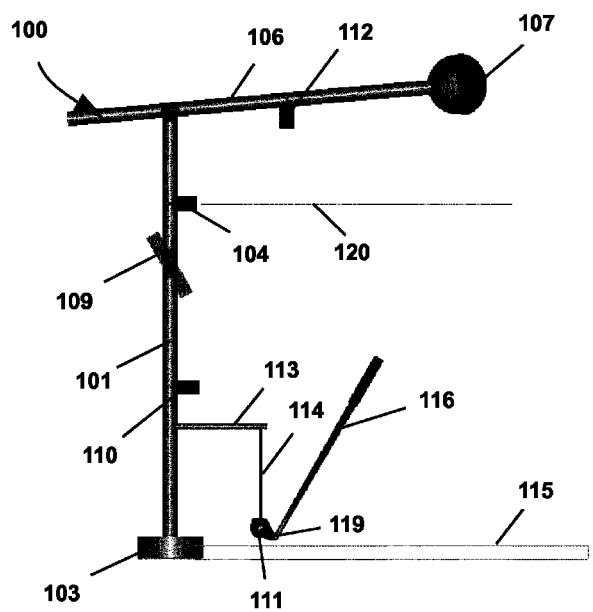
FIG. 3 is a lateral view of the same device for training the swing, according to the present invention.
Figure 4:
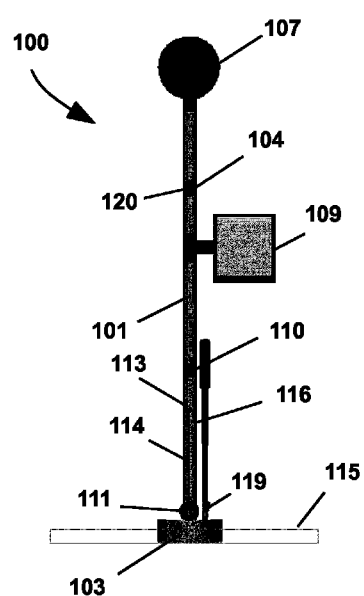
FIG. 4 is a front view of the same device for training the swing, according to the present invention.
Figure 5:
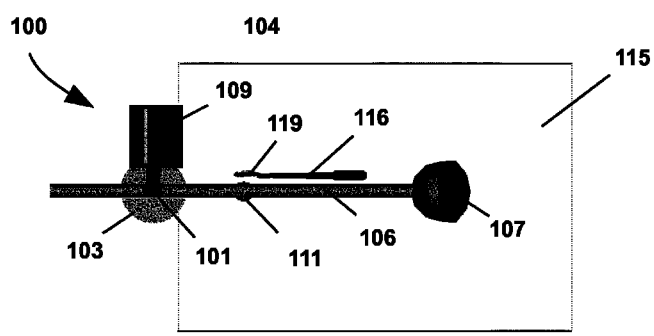
FIG. 5 is a top view of the same device for training the swing, according to the present invention.
Figure 6:
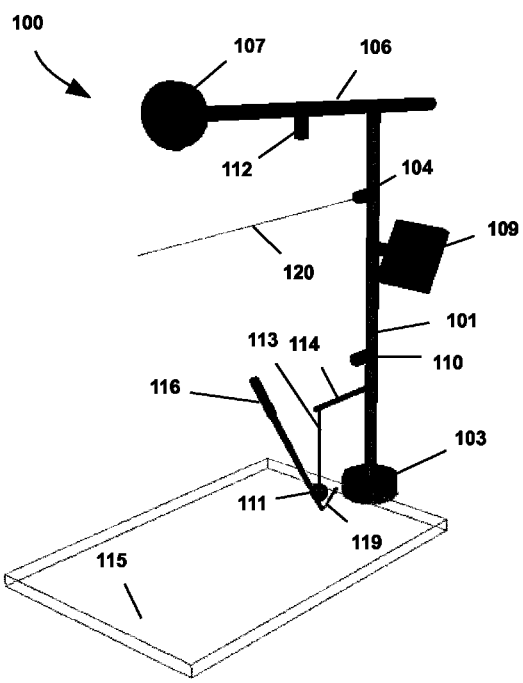
FIG. 6 is a perspective top view of the same device for training the swing of FIGS. 2-5.

It is underlined that only few of the many conceivable embodiments of the present invention are here described, which are just some specific non-limiting examples, having the possibility to describe many other embodiments based on the disclosed technical solutions of the present invention. In different figures, the same elements will be indicated with the same reference numbers.

FIGS. 2-6 show a device for training the swing 100, according to the present invention, that is preferably used for an indoor training. The device 100 basically comprises a supporting element 107 for the player's 102 head 108, and a protruding element 113 to which a golf ball 111 is attached. A vertical rigid rod 101 is installed on a supporting element 103 jointed, at its own upper end, to a horizontal rigid rod 106; the horizontal rod 106 is further jointed to a supporting terminal element 107 on which a golf player 102 can keep his head continuously in touch.

A protruding element 113 is connected to the vertical rod 101, and a little rope 114 is tied to its end, where a golf ball 111 is in turn appended and kept attached.

The device 100 further includes an emitter/detector of a laser beam 104, a videocamera system 110, 112, and a data processing and presentation unit 109. The device emitter/detector of a laser beam 104 is able to emit and detect the laser beam reflected by a small plate 105 placed on the upper part of the player's arm, and therefore it is able to detect the angle of rotation of the player's bust 102 in respect to the front direction.

The videocamera system 110, 112, and the software for image processing is able to detect in real time the space coordinates and the orientation of a golf club 116. The data processing and presentation unit 109 receives as input mainly the following data: from the laser device 104, data related to the angle of the player's arm 102; from the videocamera system 110, 112, data related to the dynamics of the club's 116 motion and of the position of the club's 116 head 119, at the moment of impact with the ball 111.

In such a way, the unit 109 can emit a signal of start at the moment when the laser device 104 detects a predefined angle of arm rotation, and therefore a corresponding angle of rotation of the player's bust 102. Furthermore, the unit 109 can emit, at the end of the swing, a signal of right swing or wrong swing on the basis of position and angle of impact detected between the club's 116 head 119 and the ball 111. FIG. 1 shows a sequence of frames in an animation regarding positions of a golf player, which represents the correct sequence of steps belonging to a swing.

Figures 7, 8, 9:
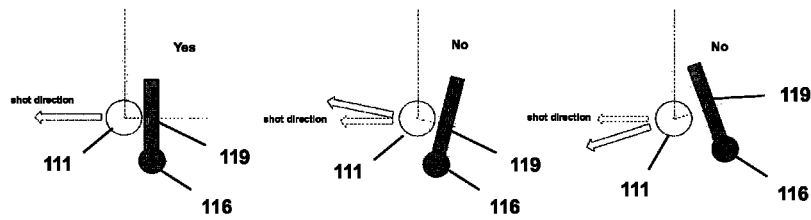
FIG. 7 is a schematic view of the correct position between head of the golf club and the ball, at the moment of touch during the swing.
FIG. 8 is a schematic view of the wrong position between head of the golf club and the ball, at the moment of touch during the swing.
FIG. 9 is a schematic view of the wrong position, because directed towards an inner angle, between head of the golf club and the ball, at the moment of touch during the swing.

FIG. 7 shows a schematic view of the correct position between head 119 of the golf club 116 and the ball 111, at the moment of touch during the swing.

Instead, FIG. 8 shows a wrong position between head 119 of the golf club 116 and the ball 111, at the moment of touch during the swing. And in a similar way, FIG. 9 shows a wrong position, because directed towards an inner angle, between the head 119 of the golf club 116 and the ball 111, at the moment of touch during the swing.

The device 110 is achieved in such a way to permit an adaptation to the body size and to a comfortable use by a player 102 using it.

First of all, the vertical rigid rod 101 can be composed of two or more cylindrical elements, telescopically connected, where the first element is placed coaxially in the second one and can translate vertically up to be blocked by a specific mechanism. A graduated scale is printed on the outer surface of the cylindrical elements, in order to be visible and to achieve a variation of height in device 100 so that it is adaptable to the body size and to the comfort of the player 102 that uses the same device 100.

Secondly, either the horizontal rigid rod 106 can be composed of two or more cylindrical elements, telescopically connected, where the first element is placed coaxially in the second one and can translate horizontally up to be blocked by a specific mechanism. Either in this case, a graduated scale is printed on the outer surface of the cylindrical elements, in order to be visible and to achieve a variation of distance of device 100 from player 102, so that it is adaptable to the body size and to the comfort of the player 102 that uses the same device 100.

Again, the connection element of the horizontal rigid rod 106 on the vertical rigid rod 101 can further include a rotation pivot and a blocking mechanism. In such a way, a variation of angle is achieved between the horizontal rod 106 and the head 108 of player 102, and this angle is adaptable to the body size and to the comfort of the player 102 that uses the same device 100.

According to another embodiment of the invention, the terminal supporting element 107 can further include a sensor of contact able to detect in real time the touch with the player's 102 forehead. Therefore, the data processing and presentation unit 109 receives in addition as input the data from said sensor of contact, so that at the end of the swing a signal of right swing or wrong swing can be generated, according to position and motion of the player's 102 head 108 during the swing.

The data processing and presentation unit 109 can include some input/output peripherals composed of:
- a touch screen that can be used by player 102 in order to select the functions of the device 100 and to visualize information, messages, graphics and physical data related to the detected swing of player 102;
- means emitting an acoustic signal, or emitting a green/red light as a consequence of said start signal or said right swing or wrong swing signals;
- data communication means, by cable or wireless, with reference to information, messages, graphics and physical data related to the detected swing of player 102.

The data processing unit 109, with said data communication means, can represent a source of input data for an external simulation system of the golf game. The data related to the swing detected in player 102 are used in order to define the trajectory and speed of a virtual ball on a virtual golf field, and a graphic engine belonging to the same external simulation system visualizes the virtual scene on a video maxi-screen.

According to another embodiment of the invention, the device 100 can further comprise a platform 115 that further includes a matrix sensor of contact able to detect in real time the touch with the player's 102 feet 117, 118. Said data processing and presentation unit 109 receives in addition as input the data from said sensor of contact, so that at the end of the swing a signal of right swing or wrong swing can be generated, according to position and motion of the player's 102 feet 117, 118 during the swing.

In device 100, the data processing and presentation unit 109 can include:
- an embedded or external database, with encoded information related to proper dynamics, during the swing, of the motion of club 116, of the position of the end 119 of the club 116 at the moment of impact with the ball (111), and the position of other parts of the player's 102 body;
- means comparing said dynamics, detected during the swing, of the position of the end 119 of the club 116 at the moment of impact with the ball 111, and the position of other parts of the player's 102 body, with respective dynamics encoded in said embedded or external database;
- means of generation, according to said comparison, of a right swing signal in case that said detected dynamics match said proper dynamics, otherwise of a wrong swing signal in case that said detected dynamics do not match said proper dynamics.

Furthermore, the system of video cameras 110, 112, and the image processing software can include: means for scanning the content of an image at each single clock time, means for application of a processing rule to said content; means of classification of the same content and detection in real time of one or more objects in the image; means for detection of the space coordinates and the orientation of said one or more objects detected, means of communication of said data related to one or more objects detected to said data processing and presentation unit 109.

Therefore, the above examples show that the present invention reaches all the expected objectives. In particular, it permits to achieve a device for training the swing, addressed to golf players, giving the support of a fixed point to the head, so that the player can become comfortable with the movements, rotating the bust and keeping the head fixed until the time of the contact with the ball has reached.

Furthermore, the invention provides an automatic computer system able to detect the angle of rotation of the player's bust in respect to the front direction, and able to provide a start signal for the execution of the swing, by an acoustic or visual signal, or by a graphic message on a video screen.

Again, the invention provides an automatic computer system able to detect the dynamics of club's motion and, at the moment of touch with the ball, to detect the exact position of the club's end, the player's head and feet, so that it can be recognized if the swing has been executed correctly or not.

Furthermore, the device of the invention is adaptable in height, distance and angle, so that it is suitable to the body and to a comfortable use of different players.

Further according to the invention, it is provided an automatic computer system able to detect in real time the complete dynamics of player's motion of body, to compare said dynamics with the content of a database, and to recognize if the swing has been executed correctly or not.

Finally, the device of the invention can be integrated in more complex systems for simulation of the golf game that use the computer graphics projected on maxi-screens, in order to reconstruct some virtual fields of golf, and the device uses the data detected in the swing in order to define the drive, the direction, the speed and the effect given to the ball.

The present invention has been described by making reference to some non-limiting examples and following some preferred embodiments; however it goes without saying that modifications and/or changes could be introduced by those skilled in the art without departing from the relevant scope, as defined in the enclosed claims.

I claim:

1. A device for training the swing, addressed to golf players, the device comprising:
   a supporting element (103) on which a vertical rigid rod (101) is placed, that is connected, at the upper end, to a horizontal rigid rod (106); said horizontal rod (106) being further connected to a terminal supporting element (107) on which a golf player (102) can keep his forehead continuously in touch; a protruding element (113), connect to said vertical rod (101), on which a chainlet (114) is connected at the end of the protruding element (113), so that a golf ball (111) is hanged and kept jointed to said chainlet (114); a laser emitting and receiving device (104), able to emit and receive a laser beam (120) reflected by a small plate (105) placed on the upper part of player's arm, and therefore able to detect the rotation angle of the player's bust (102) with respect to the golf ball (111); a system of video cameras (110, 112) and image processing software able to detect in real time the space coordinates and an orientation of a golf club (116); a data processing and presentation unit (109), that receives as input, data from said laser device (104) related to the player's (102) arm angle, and data from said system of video cameras (110, 112) related to the dynamics of the motion of the golf club (116) and a position of a head (119) of the golf club (116)" at the moment of the impact on the golf ball (111); so that a start signal can be generated at the time that the laser device (104) detects a specific rotation angle of the arm, and therefore a related rotation angle of the player's (102) bust, and so that at the end of the swing a signal of right swing or wrong swing can be generated, according to position and impact angle between the head (119) of the golf club (116) and the golf ball (111).

2. The device of claim 1 in which:
said vertical rigid rod (101) is composed of two or more cylindrical elements, telescopically connected, where a first one of the cylindrical elements is placed coaxially in a second one of the cylindrical elements and can translate vertically up to be blocked by a specific mechanism; a graduated scale is printed on an outer surface of the two or more cylindrical elements, in order to be visible and to achieve a variation of height in device (100) so that it is adaptable to a body size and to a comfort of the player (102) that uses the same device (100).

3. The device of claim 1 in which:
said horizontal rigid rod (106) is composed of two or more cylindrical elements, telescopically connected, where the first one or the cylindrical elements is placed coaxially in the second one of the cylindrical element and can translate horizontally up to be blocked by a specific mechanism; a graduated scale is printed on an outer surface of the two or more cylindrical elements, in order to be visible and to achieve a variation of distance of device (100) from player (102), so that it is adaptable to a body size and a comfort of the player (102) that uses the same device (100).

4. The device of claim 3 further comprising:
a connection element of said horizontal rigid rod (106) on said vertical rigid rod (101), that further includes a rotation pivot and a blocking mechanism, so that a variation of angle is achieved between the horizontal rigid rod (106) and the head (108) of player (102), and this angle is adaptable to the body size and to the comfort of the player (102) that uses the same device (100).

5. The device of claim 1 in which:
said terminal supporting element (107) further includes a sensor of contact able to detect in real time the touch with the player's (102) forehead; said data processing and presentation unit (109) receives in addition as input, data from said sensor of contact, so that at the end of the swing a signal of right swing or wrong swing can be generated, according to position and motion of the player's (102) head (108) during the swing.

6. The device of claim 1 in which said data processing and presentation unit (109) includes some input/output peripherals including:
a touch screen that can be used by the player (102) in order to select the functions of the device (100) and to visualize information, messages, graphics and physical data related to the detected swing of player (102);
means emitting an acoustic signal, or emitting a green/red light as a consequence of said start signal or said right swing or wrong swing signals;
data communication means, by cable or wireless, with reference to the information, messages, graphics and physical data related to the detected swing of player (102).

7. The device of claim 6 in which:
said data processing and presentation unit (109), with said data communication means represents a source of input data for an external simulation system of a golf game; data related to the swing detected in player (102) are used in order to define a trajectory and speed of a virtual golf ball on a virtual golf field, and a graphic engine belonging to the same external simulation system visualizes a virtual scene on a video maxi-screen.

8. The device of claim 1 further comprising:
a platform (115) that further includes a matrix sensor of contact able to detect in real time the touch with the player's (102) feet (117, 118); said data processing and presentation unit (109) receives in addition as input the data from said sensor of contact, so that at the end of the swing a signal of right swing or wrong swing can be generated, according to position and motion of the player's (102) feet (117, 118) during the swing.

9. The device of claim 1 wherein said data processing and presentation unit (109) includes:
an embedded or external database, with encoded information related to proper dynamics, during the swing, of the motion of the golf club (116), of the position of the head (119) of the golf club (116) at the moment of impact with the ball (111), and the position of other parts of the player's (102) body; means comparing said dynamics, detected during the swing, of the position of the head (119) of the golf club (116) at the moment of impact with the golf ball (111), and the position of other parts of the player's (102) body, with respective dynamics encoded in said embedded or external database;
means of generation, according to said comparison, of a right swing signal in case that said detected dynamics match said proper dynamics, otherwise of a wrong swing signal in case that said detected dynamics do not match said proper dynamics.

10. The device of claim 1 wherein:
said system of video cameras (110, 112) and said image processing software includes: means for scanning the content of an image at each single clock time, means for application of a processing rule to said content; means of classification of the same content and detection in real time of one or more objects in the image; means for detection of space coordinates and an orientation of said one or more objects detected, means of communication of data related to said one or more objects detected to said data processing and presentation unit (109).

* * * * *